United States Patent
Nguyen et al.

(10) Patent No.: US 6,526,116 B1
(45) Date of Patent: *Feb. 25, 2003

(54) NUCLEAR FUEL ASSEMBLY WITH HYDRAULICALLY BALANCED MIXING VANES

(75) Inventors: Quang M. Nguyen, Columbia, SC (US); Yu C. Lee, Columbia, SC (US); Edmund E. DeMario, Columbia, SC (US); Jeffrey J. Fodi, Columbia, SC (US); Darin L. Redinger, Columbia, SC (US); Levie D. Smith, III, Columbia, SC (US)

(73) Assignee: Westinghouse Electric Company LLC, Pittsburgh, PA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/887,017

(22) Filed: Jul. 2, 1997

(51) Int. Cl.[7] ............................................... G21C 3/322
(52) U.S. Cl. ........................ 376/439; 376/434; 376/442; 376/443; 376/449
(58) Field of Search ................................ 376/434, 439, 376/442, 443, 449

(56) References Cited

U.S. PATENT DOCUMENTS

| 3,862,000 | A | * | 1/1975 | Pugh et al. ................. 176/78 |
| 4,324,618 | A | * | 4/1982 | Schluderberg ............. 376/434 |
| 4,448,745 | A | * | 5/1984 | Anthony ..................... 376/448 |
| 4,522,781 | A | * | 6/1985 | Schluderberg ............. 376/427 |
| 4,652,416 | A | * | 3/1987 | Millot ......................... 376/209 |
| 4,725,402 | A |   | 2/1988 | Krawiec ..................... 376/438 |
| 4,758,403 | A | * | 7/1988 | Noailly ....................... 376/439 |
| 4,778,647 | A | * | 10/1988 | Gasparro ................... 376/347 |
| 4,820,058 | A | * | 4/1989 | Wilson et al. .............. 376/327 |
| 4,879,090 | A |   | 11/1989 | Perrotti et al. ............. 376/462 |
| 4,900,508 | A |   | 2/1990 | Anthony .................... 376/438 |
| 4,990,304 | A | * | 2/1991 | Rylatt ......................... 376/434 |
| 5,139,736 | A |   | 8/1992 | Bryan ......................... 376/442 |
| 5,180,548 | A | * | 1/1993 | Verdier ....................... 376/439 |
| 5,183,629 | A | * | 2/1993 | Canat et al. ................ 376/439 |
| 5,186,891 | A | * | 2/1993 | Johansson et al. ......... 376/438 |

(List continued on next page.)

FOREIGN PATENT DOCUMENTS

| EP | 0214895 | * | 3/1987 |
| JP | 1219890 | * | 9/1986 |
| JP | 406094873 | * | 4/1994 |

*Primary Examiner*—Michael L. Carone
*Assistant Examiner*—John Richardson

(57) ABSTRACT

A support grid for laterally maintaining the relative position of elongated fuel elements within a fuel assembly for use within a core of a nuclear reactor. The grid is formed in the shape of a lattice with the intersecting lattice members defining a plurality of cells, most of which respectively support the nuclear fuel elements. The remaining cells support nuclear control rod guide tubes and instrumentation thimbles. The cells supporting the nuclear fuel elements are provided with diagonally positioned springs on two, adjacent walls. The springs support the fuel elements against dimples which protrude from the opposite cell walls. The adjacent, diagonal springs in each fuel element cell are inclined in opposite directions. The walls of the cells supporting the control rod guide tubes are embossed along their height at the locations intermediate the intersection between adjoining walls with a concave notch having a curvature which conforms to the outside surface curvature of the control rod guide tubes. The grid is provided with mixing vanes which are positioned in a symmetrical, regional pattern, with the pattern varying between adjacent regions, and configured such that the hydraulic forces across the center of the grid are balanced. The grid is reinforced with welds at the mid point of the intersection of the lattice straps.

13 Claims, 4 Drawing Sheets

U.S. PATENT DOCUMENTS

| | | | |
|---|---|---|---|
| 5,188,797 A | 2/1993 | Bryan | 376/438 |
| 5,265,140 A | 11/1993 | Perrotti | 376/438 |
| 5,299,245 A * | 3/1994 | Aldrich et al. | 376/439 |
| 5,303,276 A | 4/1994 | DeMario et al. | 376/442 |
| 5,307,393 A * | 4/1994 | Hatfield | 376/442 |
| 5,357,547 A * | 10/1994 | Obermeyer et al. | 376/254 |
| 5,402,457 A * | 3/1995 | Suchy et al. | 376/443 |
| 5,440,599 A * | 8/1995 | Rodack et al. | 376/439 |
| 5,515,408 A * | 5/1996 | Oyama et al. | 376/434 |
| 5,530,729 A * | 6/1996 | Gustafsson | 376/439 |

\* cited by examiner

NUCLEAR FUEL ASSEMBLY WITH HYDRAULICALLY BALANCED MIXING VANES

Cross-Reference to Related Applications. This Application is related to U.S. Pat. No. 6,144,716 issued Nov. 7, 2000, filed contemporaneously herewith.

BACKGROUND OF THE INVENTION

1. Field of the Invention

This invention relates generally to nuclear reactor fuel element support grids and more particularly to support grids that include mixing vanes.

2. Background Information

Fuel assemblies for nuclear reactors are generally formed from an array of elongated fuel elements or rods maintained in a laterally spaced relationship by a skeletal support structure, including a plurality of longitudinally spaced support grids, a lower end fitting, and an upper end fitting. The fuel assembly skeleton also includes guide tubes and instrumentation thimbles, which are elongated tubular members symmetrically interspersed among and positioned coextensive with the fuel element locations. The guide tubes and instrumentation thimbles are fixedly connected to the support grids to provide the structural coupling between the other skeletal members. The support grids each define an array of fuel rod support compartments or cells and have a perimeter that is configured in one of a number of alternate geometrical shapes that is dictated by the reactor core design. Nuclear fuel grids for commercial pressurized water reactors employing square fuel assemblies can typically have between 14 and 17 cells per side. Other polygonal array designs are also employed, such as the hexagonal array illustrated in U.S. Pat. No. 5,303,276, issued Apr. 12, 1994.

Each interior lattice forming member is slotted over one half of its width along its lines of intersection with the other grid forming members of the array. The members are assembled and interlocked at the lines of intersection with the slot in one member fitting into the opposing slot in the crossing member in an "egg-crate" fashion. This egg-crate design provides a good strength to weight ratio without severely impeding the flow of coolant that passes through the grid in an operating nuclear reactor. The lattice-forming members typically include projecting springs and dimples for engaging and supporting the fuel elements within some of the grid compartments. The springs provide axial, lateral and rotational restraint against fuel rod motion during reactor operation under the force of coolant flow, during seismic disturbances, or in the event of external impact. These spacer grids also act as lateral guides during insertion and withdrawal of the fuel assemblies from the reactor.

One of the operating limitations on current reactors is established by the onset of film boiling on the surfaces of the fuel elements. The phenomenon is commonly referred to as departure from nuclear boiling (DNB) and is affected by the fuel element spacing, system pressure, heat flux, coolant enthalpy and coolant velocity. When DNB is experienced, there is a rapid rise in temperature of the fuel element due to the reduced heat transfer that occurs under these conditions as a result of the gaseous film that forms on portions of the fuel element surface, which can ultimately result in failure of the fuel element if it was to continue. Therefore, in order to maintain a factor of safety, nuclear reactors must be operated at a heat flux level somewhat lower than that at which DNB occurs. This margin is commonly referred to as the "thermal margin."

Nuclear reactors normally have regions in the core that have a higher neutron flux and power density than other regions. The variation in flux and power density can be caused by a number of factors, one of which is the presence of control rod channels in the core. When the control rods are withdrawn, these channels are filled with coolant, a moderator, which increases the local moderating capacity and thereby increases the power generated in the adjoining fuel. In these regions of high power density known as hot channels, there is a higher rate of enthalpy rise than in other channels. These hot channels set the maximum operating conditions for the reactor and limit the amount of power that can be generated, since it is in these channels that the critical thermal margin is first reached.

The prior art has attempted to reduce the variation in power density across the core and thus increase the DNB performance by providing coolant flow deflector vanes as an integral part of the fuel support grids. The vanes improve performance by increasing heat transfer between the fuel rods and the coolant downstream of the vane locations. This approach to improving performance has met with varying degrees of success depending on the vane design and the design of other grid components, which can impact the effectiveness of the vanes. To maximize the benefit of the vanes, the size, shape, bend angle, and location of the vanes must be optimized. The vanes are especially beneficial in the regions adjoining the hot channels, which are the fuel element positions adjacent to the control rod guide tube locations. It is also desirable to streamline the remaining grid components, i.e., the lattice straps, including the springs, dimples and welds, to reduce the turbulence generated in the vicinity of the vanes. Other objectives in optimizing fuel grid designs include minimizing grid pressure drop and maximizing grid load carrying strength.

In the past, nuclear fuel grid designers have mostly employed uniform coolant mixing vane patterns over the entire support grid structure. Another prior art design has used a mirror image pattern in adjacent halves of the grid, 180° degrees out of phase. Some of these designs have experienced coolant flow induced vibrations, which can cause fretting of the fuel rods and affect their long term performance. Accordingly, an improved grid structure is desired that improves DNB performance and reduces vibrations resulting from the hydraulic turbulence generated by the grid mixing vanes. It is a further object of this invention to provide such a structure that exhibits a minimum of pressure drop and improved load carrying strength.

SUMMARY OF THE INVENTION

The structure of this invention overcomes some of the difficulties experienced in using prior art nuclear support grid designs by establishing helical coolant flow patterns in three or more symmetrical regions across the grid, that are hydraulically balanced across the grid's center. The perimeter of the grid is shaped as an equilateral polygon and the symmetrical regions are bordered by the perimeter and lines extending between the mid point of the perimeter segments and the center of the grid. The interior of the grid is formed from a lattice whose members define the cells through which the fuel elements, control rod guide tubes, and instrumentation thimbles are supported. In one embodiment the coolant mixing vanes extend from at least some of the upper walls of the cells supporting the fuel elements. Aside from their orientation, the mixing vane pattern in each region is identical. The orientation of the pattern from region to region is rotated about the center of the grid "N" degrees, where "N" equals 360 divided by the number of segments that make up the grid perimeter.

In the preferred embodiment, the walls of the cells that surround the control rod guide tubes and instrument thimbles do not support mixing vanes and are embossed at their mid point between intersections with adjacent walls, along their height, with a concave notch that substantially matches the outside curvature of the control rod guide tubes and instrumentation thimbles, respectively. The embossed locations permit the use of tube and thimble diameters that are larger than the nominal width of the cells. Each cell is welded at a location intermediate its upper and lower ends at the intersection of its lattice straps, to improve its crush resistant strength.

Thus, the combination of rotatable and symmetrical features of the coolant mixing vane pattern produces balanced hydraulic forces acting on the fuel assembly members that enhance the support grid's anti-vibration properties. In addition, the structural arrangement of this invention improves the strength of the grid while accommodating control rod guide tubes and instrumentation thimbles of a larger diameter than the fuel elements.

These and other objects, features, and advantages of the present invention will become apparent to those skilled in the art upon a reading of the following description when taken in conjunction with the drawings wherein there is shown and described illustrative embodiments of the invention.

BRIEF DESCRIPTION OF THE DRAWINGS

While the specification concludes with claims specifically pointing out and distinctly claiming the subject matter of the invention, it is believed the invention will be better understood from the following description, taken in conjunction with the accompanying drawings wherein:

DESCRIPTION OF THE PREFERRED EMBODIMENT

In a typical nuclear reactor heat is generated within the core of the reactor vessel as a result of nuclear fission. The heat is employed to generate steam, which in turn drives turbine-generators to produce electricity. In a pressurized water nuclear reactor the heat in the core is transferred to a coolant moderator, commonly borated water, which is transported under pressure to a steam generator that places the coolant in heat transfer relationship with a secondary fluid. The secondary fluid is vaporized into steam which is used to drive the turbine-generators.

The nuclear fuel within the core is typically encapsulated in cylindrical, elongated rods often referred to as fuel elements. The fuel elements are maintained in a polygonal array and, in one preferred embodiment, extend in a longitudinal direction to a length of approximately fourteen feet. The array is generally referred to as a fuel assembly and is bounded by an upper and lower nozzle and maintained in position and appropriately spaced by fuel element support grids that are secured at spaced locations along the longitudinal length of the assembly.

Interspersed among the fuel elements within the assembly are control rod guide tubes and instrumentation thimbles that are symmetrically arranged in place of fuel element locations and are used to guide the control rods and act as conduits for in-core instrumentation. The control rods are used to control the fission process by absorbing neutrons in the core that would otherwise react with the nuclear fuel. The control rods are movable into and out of the core through the guide tubes to control the level of reactivity.

The coolant within the core that flows from a region below the fuel, up through each fuel assembly and out its nozzle, includes a moderator such as Boron that slows the speed of the neutrons to increase the efficiency of the fission process. When the control rods are removed from the core the corresponding thimble tubes are filled with the coolant moderator which increases the fission reactions in the fuel in the cells surrounding those guide tubes. A more detailed understanding of the operation of a pressured water nuclear reactor can be had by referring to U.S. Pat. No. 5,303,276 issued Apr. 12, 1994, entitled "FUEL ASSEMBLY INCLUDING DEFLECTIVE VANES FOR DEFLECTING A COMPONENT OF THE FLUID STREAM FLOWING PAST SUCH A FUEL ASSEMBLY."

Figure 1:
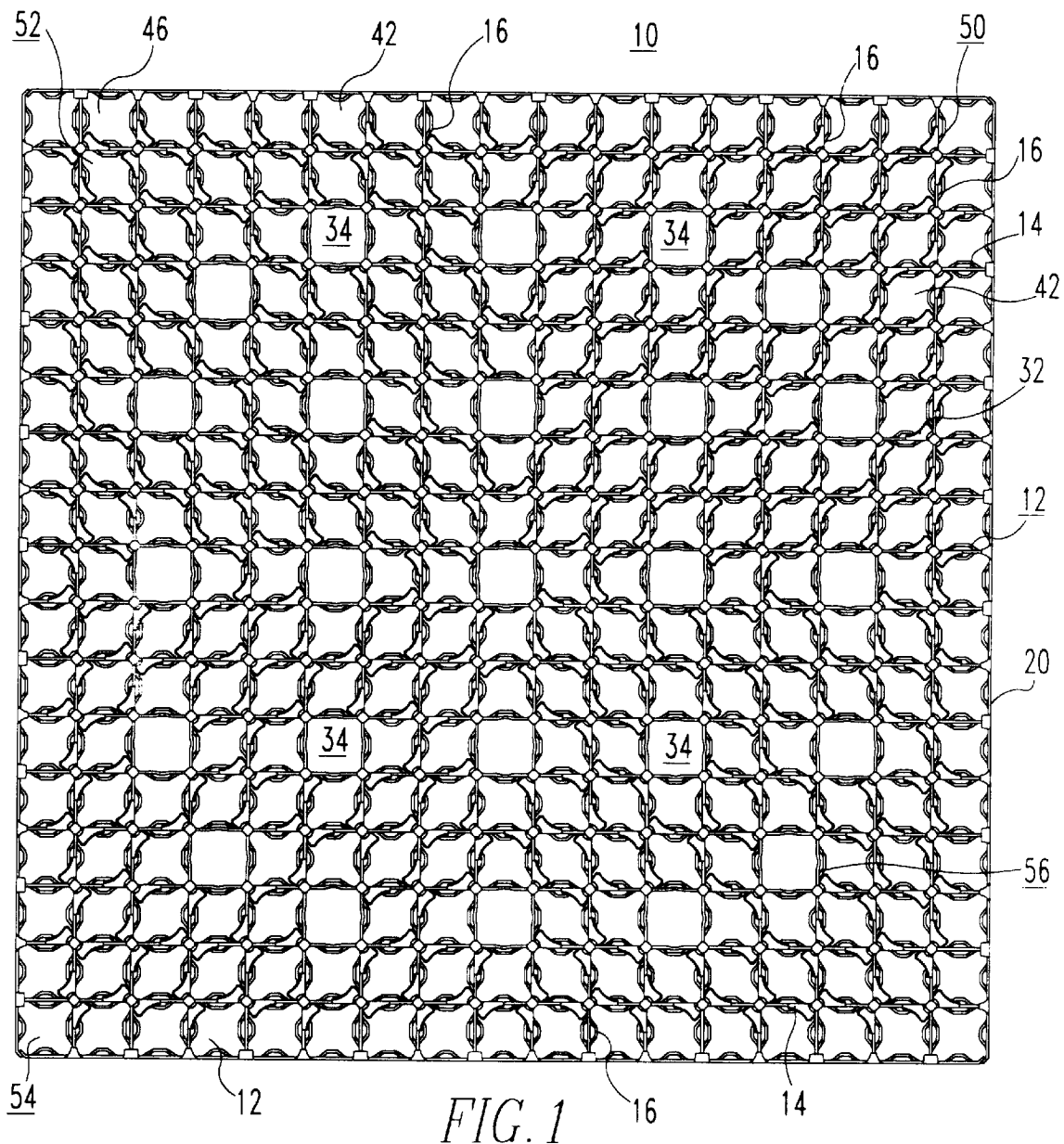
FIG. 1 is a top elevational view of the grid support assembly of this invention showing the mixing vane pattern in a four region equilateral, quadrilateral design.
Figure 2:
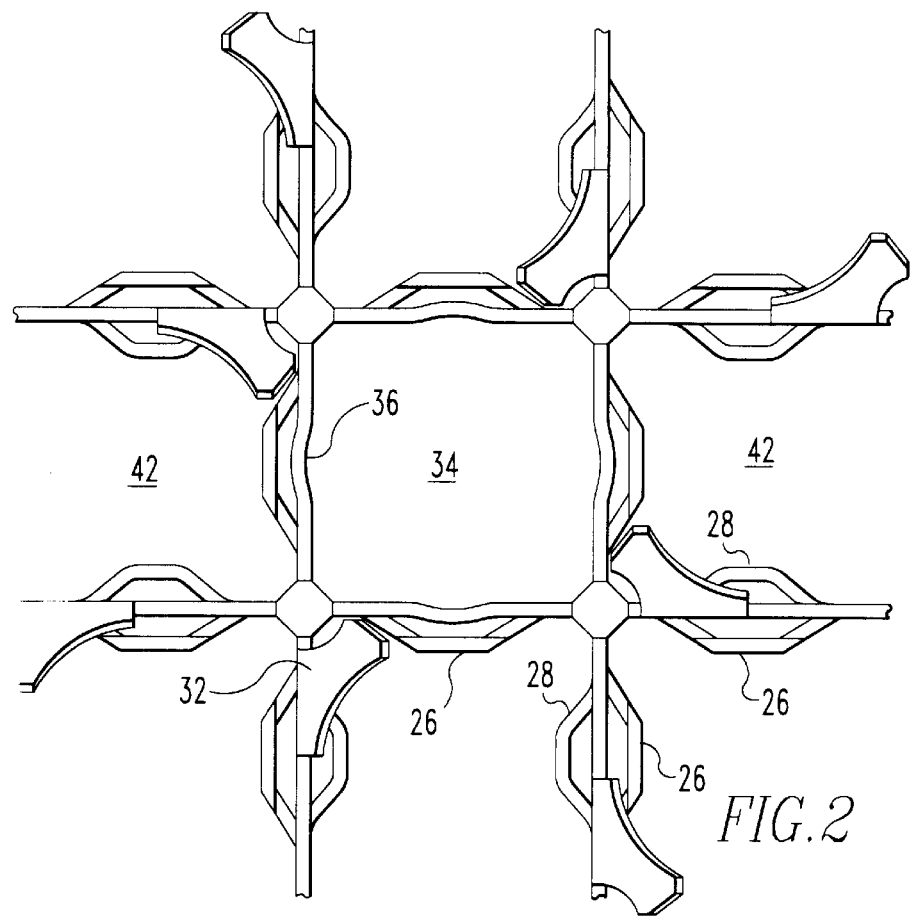
FIG. 2 is a plan view of an enlarged portion of the center cell of FIG. 1.

FIG. 1 is a top plan view of a fuel assembly support grid 10 incorporating features of this invention and having a perimeter 12 formed in the shape of an equilateral, quadrilateral, polygon, or square. It should be appreciated, however, that the concepts of this invention can be applied to fuel element support grids employing different shaped perimeters, such as the hexagonal fuel assembly illustrated in the previously referenced U.S. Pat. No. 5,303,276. The grid assembly illustrated in FIG. 1 is constructed from an evenly spaced, parallel array of lattice grid straps 14, which intersect with a similar, orthogonally positioned, evenly spaced, parallel array of lattice grid straps 16. The lattice array is welded to a peripheral strap 20 which forms the perimeter of the grid. The walls of the straps, intermediate the intersections with the corresponding orthogonal straps, define cells through which the fuel elements, guide tubes and instrumentation thimbles pass.

Figure 3:
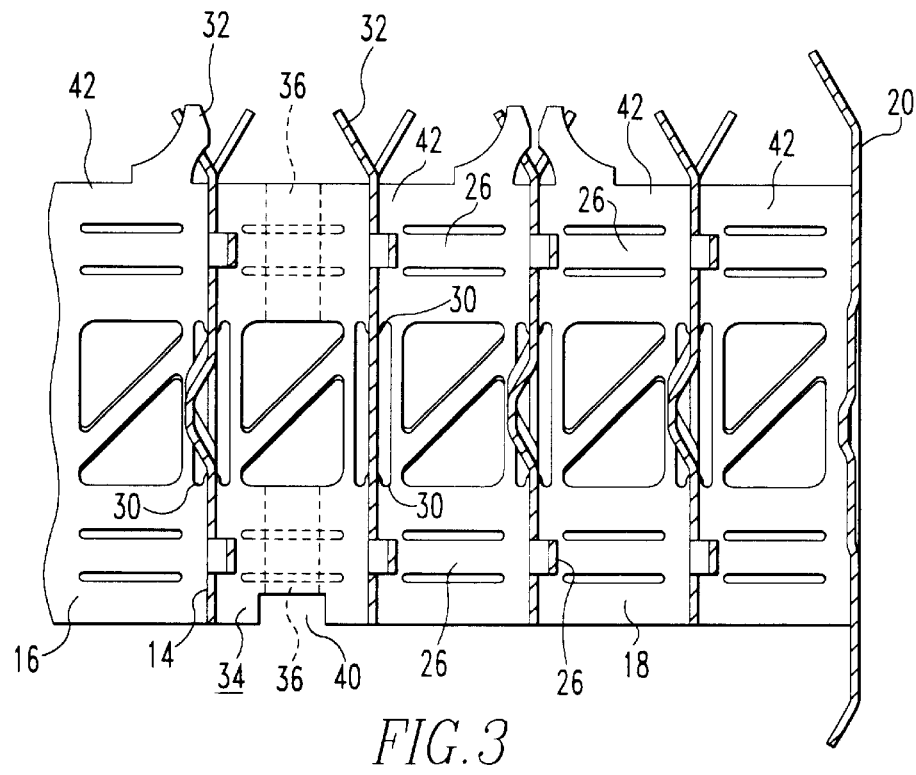
FIG. 3 is a side elevation of one of the interior straps of the lattice assembly forming the cells of the support grid.

FIG. 1 illustrates a 17 by 17 array of cells, though it should be appreciated that the application of the principles of this invention are not affected by the number of fuel elements in an assembly. The lattice straps which form the orthogonal members 14 and 16 shown in FIG. 1, are substantially identical in design and are better illustrated in FIGS. 3 and 6 by reference character 18. While the lattice straps 14 and 16 are substantially identical, it should be appreciated that the design of some lattice straps 16 will vary from other lattice straps 16, as well as some straps 14 vary from other straps 14, to accommodate guide tube and instrument thimble locations. Reference character 42 in FIG. 1 identifies those cells which support fuel elements and reference character 34 shows the cells that are attached to the guide tubes and instrumentation thimbles. FIG. 3 provides the best view of the orthogonal intersections between lattice straps 14 and 16. Most walls of the cells that accommodate fuel elements are provided with a number of stamped, protruding segments that are tooled by appropriate dies as is known and used in the industry. The upper and lower stamped segments 26 bulge out in one direction and form dimples for supporting the fuel elements against juxtaposed diagonal springs which protrude from the opposite cell wall.

The remaining centrally located, stamped section 28 in the same wall as the previously described dimples, bulges in the opposite direction into the adjacent cell and forms a diagonal spring for pressuring the fuel element against dimples 26 which protrude into the that adjacent cell from its opposite wall. The preferred design of the diagonal spring can better be appreciated by reference to U.S. Pat. No. 6,144,716 issued Nov. 7, 2000, which was filed contemporaneous herewith.

Mixing vanes 32 extend from the upper edges of the lattice straps at some of the segments which form the walls of the cells 42 through which the fuel assemblies pass. In accordance with this invention, the mixing vanes are arranged in a predetermined pattern that can be better appreciated by referring to FIG. 1 and will be described more fully hereafter.

The cells 34 support the guide tubes and instrumentation thimbles through which the control rods and the in-core instrumentation pass. The cells 34 differ from the fuel element support cells 42 in that they have none of the support members 26 or 28 protruding into their interior or mixing vanes 32 extending from their walls. The cells 34 further differ in that they have a concave, embossed section 36 at the center of the cell walls extending from the bottom to the top of the lattice strap. The curvature of the concave section is substantially matched to the circumferential curvature of the corresponding guide tubes or instrumentation thimbles that it mates with. The embossed grid locations accommodate guide tubes and instrumentation thimbles of a larger diameter than the fuel elements which provides greater clearance for control rod and instrumentation movement. This feature is particularly important in today's competitive markets where demands for greater fuel economy has necessitated longer fuel burn-up cycles, which can induce some minor distortions within the fuel assemblies. In one preferred embodiment, the tubes and thimbles are welded to at least some of the embossed areas in each cell 34. The guide tubes and thimble cells 34 also differ from the fuel locations in that they have a rectangular notched section 40 cut-out of their lower side over the embossed area, which provides the welding surface for the attachment of a sleeve which supports the thimble tube.

Weld tabs 30 are stamped at each intersection of the cell walls intermediate of the height of the cell and are folded out and welded to improve the crush resistant strength of the grid assembly. Each strap 18 terminates at the perimeter strap 20 to which it is also welded.

Figure 6:
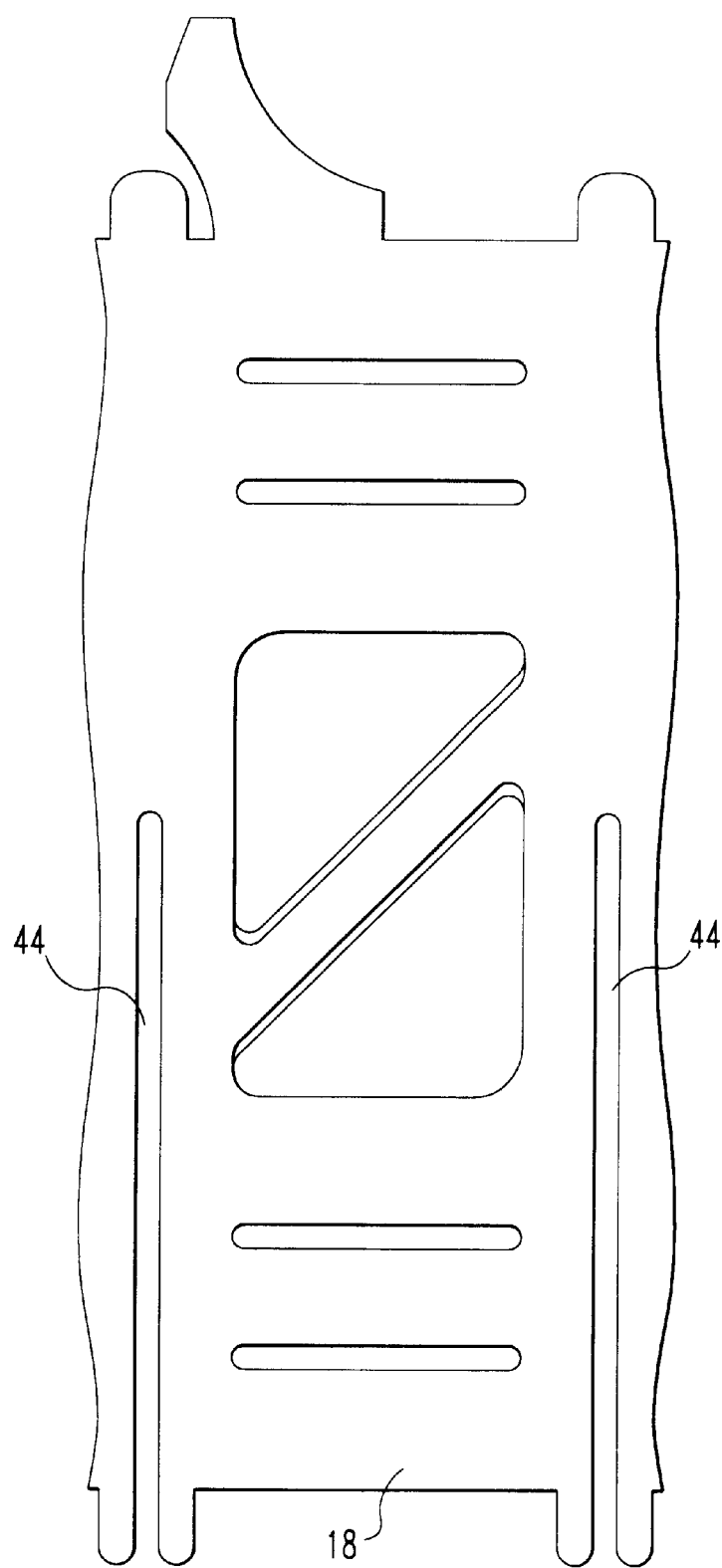
FIG. 6 is a partial side elevation of the lattice strap of FIG. 3 uncoupled from the intersecting lattice members.

FIG. 6 illustrates a portion of the lattice strap 18 that forms the wall to a single cell and extends just over the position where it would intersect with the corresponding, adjacent, orthogonal lattice straps to which it would be attached. The straps 18 are provided with slits 44 which in some cases extend from the bottom of the strap to half way up its height, at the intersection locations where it meets with the straps running in the orthogonal direction. The orthogonally positioned straps are provided with similar slits 44 that extends from their top surface to half way down the strap. The straps are then fitted together at their slits with one slit sliding over the other at each intersection to form an egg-crate pattern that locks the intersections and defines the cells. FIG. 6 does not show the weld tabs 30 that were previously described with reference to FIG. 3.

Figure 4:
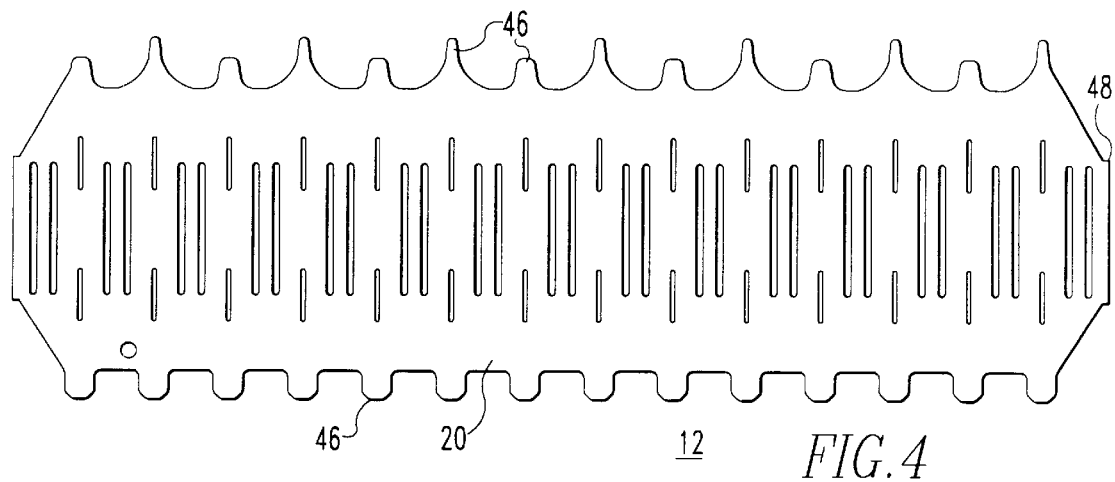
FIG. 4 is a side elevation of the perimeter strap surrounding the lattice straps illustrated in FIG. 3.
Figure 5:
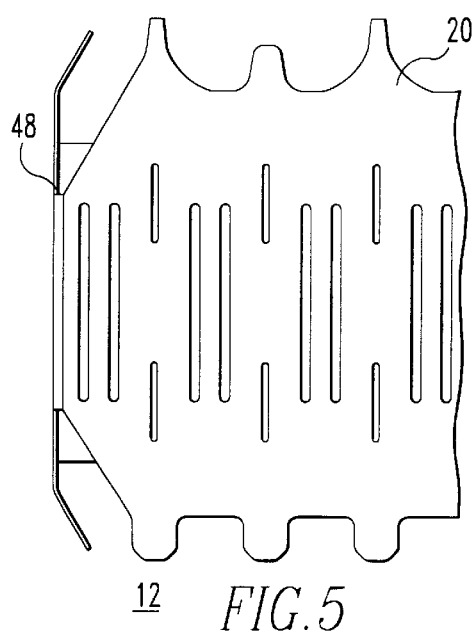
FIG. 5 is a side elevation of the perimeter strap at a corner location.

FIGS. 4 and 5 illustrate the design of the perimeter straps 20. FIG. 4 shows one side of the perimeter strap 20, which includes protective tabs 46 of differing geometries, that extend from the upper and lower edges of the strap and are bent inwardly. The protective tabs function to avoid hang-up of the fuel assemblies against adjacent assemblies as they are inserted or withdrawn from the reactor core. The straps are tapered at their corners 48 and bent around the corners as shown in FIG. 5.

Broadly, this invention overcomes the flow-induced fuel assembly vibrations experienced by some prior art mixing vane designs by providing a hydraulically balanced mixing vane pattern over a plane orthogonal to the longitudinal dimension of the fuel assembly, that produces a force, moment, and torque equilibrium due to uniformly distributed lift and drag forces. In addition, within each individual grid cell at the fuel element support locations, the inclined grid springs on adjacent cell walls, shown in FIG. 3 by reference character 28, age inclined in opposite directions in order to minimize any unbalanced torques due to the hydraulic lift forces acting along the edge of the springs. This arrangement further reduces the potential for producing a rotational twist bias on the fuel assembly.

One embodiment for achieving the hydraulically balanced vane pattern of this invention is illustrated in FIG. 1, as applied to a square 17 by 17 fuel assembly array. For the purpose of defining the vane pattern, the grid is divided into four quadrants 50, 52, 54 and 56. Each quadrant is defined by the perimeter and lines drawn between the mid point of each perimeter segment and the center of the grid. In each quadrant the vanes are positioned at the cell corners over the fuel element locations and extend along lines parallel to a line extending from the center of the grid to the corresponding corner of the quadrant. Each quadrant contains the same number of vanes. The overall pattern in this embodiment forms an "X" about the central axis of the fuel assembly.

In the embodiment illustrated in FIG. 1, the pattern in each quadrant can be replicated by rotating the entire grid in 90-degree increments about its center. Accordingly, the pattern is 90-degrees rotatable. The combination of rotatable and symmetrical features of this pattern produces a balance of the hydraulic forces acting against the vanes, thus enhancing the grid's anti-vibration properties. In this preferred embodiment, the invention is shown as being applied to a quadrilateral fuel assembly design. It should also be appreciated that the invention can work equally as well in fuel assembly grid designs having a equilateral polygon perimeter shape with a different number of sides than is shown in this preferred embodiment; for example, the hexagonal design illustrated in U.S. Pat. No. 5,303,276 referenced above. In that case, the vane design regions would be defined by the perimeter and lines extending from the mid-point of the perimeter segments through the center of the grid. The vanes would still be positioned at the fuel element support locations and follow lines parallel to a line extending between the corresponding intersection of perimeter segments and the center of the grid. In this case, the design would be rotatable "N" degrees, wherein "N" equals 360 divided by the number of perimeter segments. Thus, the hydraulically balanced vane configuration of this invention can be applied to other grid configurations. Similarly, while in this embodiment the vane pattern has been shown supported from the upper edge of the grid, at the fuel element support cells, it should be appreciated that a similar result could be achieved by vanes supported at other locations along the assembly over a plane orthogonal to the longitudinal dimension of the fuel assembly.

Accordingly, this invention provides an improved fuel assembly incorporating a support grid design and deflector vane pattern that optimize reactor coolant flow during operation in a manner that improves DNB performance with a minimum of vibration, reduces pressure drop and improves grid crush resistance strength. The grid of this invention also accommodates guide tubes and instrumentation thimbles of a larger diameter than the fuel elements, which increase the design clearance between the control rods and the guide tubes and lessons the likelihood of a control rod or instrumentation hang up.

What is claimed is:

1. A support grid for laterally maintaining the relative position of elongated fuel elements within a fuel assembly for use within a core of a nuclear reactor, the grid having a lattice structure which defines a plurality of cells some of through which the fuel elements are respectively supported, others of which support guide tubes for control rods, each of the cells having a plurality of walls which intersect at corners and surround the corresponding fuel element or guide tube at the support location, including:

vane mans attached to the support grid for mixing coolant which flows through the core of the nuclear reactor during operation, as the coolant traverses the fuel assembly proximate the grid location, the vane means are supported by the cell walls, proximate a corner over most of the cells that support fuel elements, with some of the cells having vane means that extend over an opening in the cell having a different number of vane means than other of the cells having a vane means that extend over its corresponding opening, the vane means being arranged in a predetermined design in each of a plurality of regions symmetrically situated around the center of the grid in a plane orthogonal to the elongated dimension of the fuel elements, the design of the orientation of the vane means in adjacent regions are different and are structured to establish a coolant flow pattern within each region that substantially counter balances hydraulic forces across the center of the grid, that result from the different orientation of coolant flow patterns in the remaining regions, which reduces support grid vibration and fuel assembly vibration during operation within the core of the nuclear reactor, and other than for vane means supported over fuel element support cells adjacent guide tube cell support locations, each vane means extends over adjacent cells.

2. The support grid of claim 1 wherein the outside geometry of the grid, in a plane orthogonal to the elongated dimension of the fuel elements, is an equilateral polygon and the symmetrical regions are defined by lines drawn from the mid points of the perimeter segments to the center of the polygon.

3. The support grid of claim 1 wherein the number of regions is greater than 2.

4. The support grid of claim 3 wherein the pattern of placement of the vane means within adjacent regions are the same except the pattern is rotated "N" degrees about the center of the polygon between each adjacent region, where "N" is equal to 360° divided by the number of regions.

5. The support grid of claim 4 wherein the portion of each vane means extending over the cell is the same design.

6. The support grid of claim 4 wherein from a perspective upstream of the grid, the vane means in each region within the perimeter point in a direction parallel to a diagonal defined as extending from the center of the polygon to the juncture of perimeter segments within the respective regions.

7. The support grid of claim 6 wherein the number of regions is 4 and the overall vane means pattern forms an "X" about the center axis of the polygon.

8. The support grid of claim 1 wherein the vane means extend only within or over the fuel element support cells.

9. The support grid of claim 8 wherein the walls of the cells supporting the control rod guide tubes are embossed with a concave notch to substantially match the outside curvature of the control rod guide tubes.

10. The support grid of claim 1 wherein the lattice member include welds at a plurality of intersects of the cell's walls intermediate the top and bottom of the cells along the longitudinal dimension of the fuel elements.

11. The support grid of claim 1 wherein at least some of the cells that support the fuel elements include diagonal springs on at least two adjacent walls, the springs extending over the substantial height of the cell from a lower cell corner to the upper cell corner on the other side of the cell wall over which the spring extends, the adjacent springs being inclined in opposite directions.

12. The support grid of claim 11 wherein each spring is attached to the corresponding wall that supports it with vertical mounted attachment members that limit the restriction to coolant flow at any point along the spring to the thickness of the spring material.

13. A nuclear fuel assembly comprising a parallel array of elongated fuel elements which are supported along their longitudinal dimension by a support grid, the grid having a lattice structure which defines a plurality of cells some of through which the fuel elements are respectively supported, others of which support guide tubes for control rods, each of the cells having a plurality of walls which intersect at corners and surround the corresponding fuel element or guide tube at the support location, including:

a mixing vane array for mixing coolant which flows through a nuclear reactor core during operation of the reactor, as the coolant traverses the fuel assembly proximate the mixing vane array location, the mixing vane array comprising vane means which are supported by the cell walls, proximate a corner over most of the cells that support fuel elements, with some of the cells having vane means that extend over an opening in the cell having a different number of vane means than other of the cells having vane means that extend over its corresponding opening, the vane means being arranged over a plane across the fuel assembly in a direction orthogonal to the longitudinal dimension of the fuel elements and are positioned in a predetermined pattern in each of a plurality of regions symmetrically situated around the center of the grid, the design of the orientation of the vane means in adjacent regions are different and are structured to establish a coolant flow pattern within each region that substantially counter balances hydraulic forces across the center of the grid, that result from the different orientation of coolant flow patterns in the remaining regions, which reduces vibration of the nuclear fuel assembly during operation of a nuclear reactor, and other than for vane means supported over fuel element support cells adjacent guide tube cell support locations, each vane means extends over adjacent cells.

* * * * *